Sept. 25, 1956  W. C. ENDERS  2,764,419
NESTING TYPE LUGGAGE CARTS

Filed April 28, 1955  3 Sheets-Sheet 1

INVENTOR
WILLIAM C. ENDERS
BY Ralph L. Bassett
ATTORNEY

Sept. 25, 1956     W. C. ENDERS     2,764,419
NESTING TYPE LUGGAGE CARTS
Filed April 28, 1955     3 Sheets-Sheet 2

INVENTOR
WILLIAM C. ENDERS

BY Ralph L Bassett

ATTORNEY

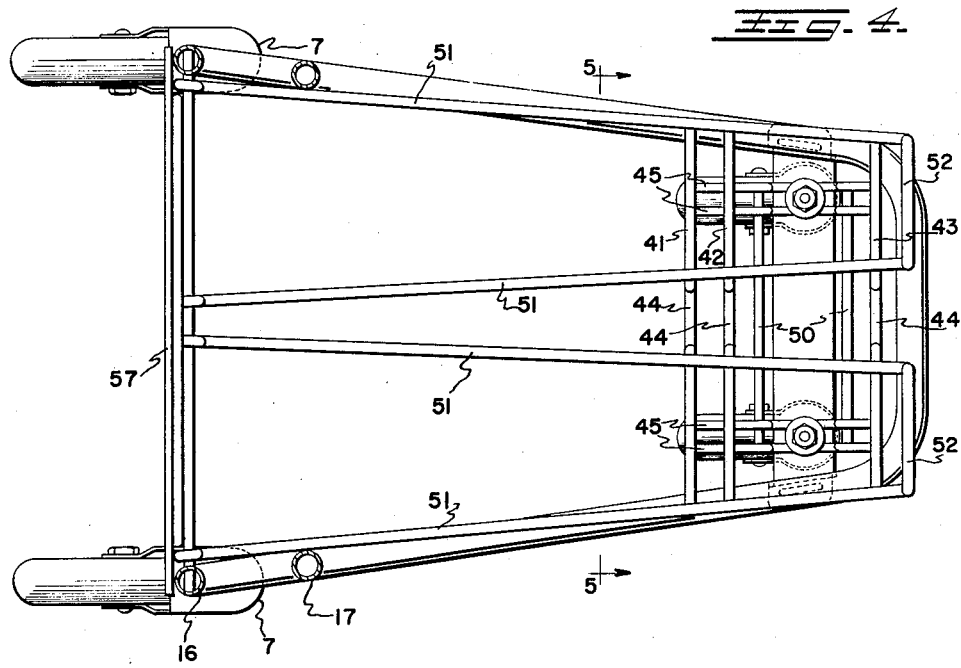

2,764,419

NESTING TYPE LUGGAGE CARTS

William C. Enders, Oklahoma City, Okla., assignor to Sylvan N. Goldman, Oklahoma City, Okla.

Application April 28, 1955, Serial No. 504,479

8 Claims. (Cl. 280—33.99)

This invention relates to improvements in luggage carts of the nesting type.

The primary object of this invention is to provide a light, rigid cart structure suitable for transporting luggage about in a railway or bus station, the cart structure being designed to facilitate nesting relation between carts of similar construction, whereby a minimum amount of area is required for parking or storing the devices.

Another object of the invention is to fabricate a luggage cart which includes a main frame of rigid construction and design, mounted on wheels and casters, which is incorporated with a main shelf and a tray for smaller articles, the main shelf and tray being constructed and associated with the main frame and adding to the rigidity of the assembly.

Other objects of the invention reside in the details of construction such as the mounting of the wheels and casters, the arrangement of the main frame which embodies the main shelf, supporting frame and the handle structure which supports a tray at the top for receiving smaller articles.

These and other objects of the invention will more clearly hereinafter appear by reference to the accompanying drawings forming a part of the instant specification and wherein like characters of reference designate corresponding parts throughout the several views, in which:

Fig. 4 is a horizontal section on line 4—4 of Fig. 1;

Fig. 5 is a transverse section on line 5—5 of Fig. 4; and

Figure 1:
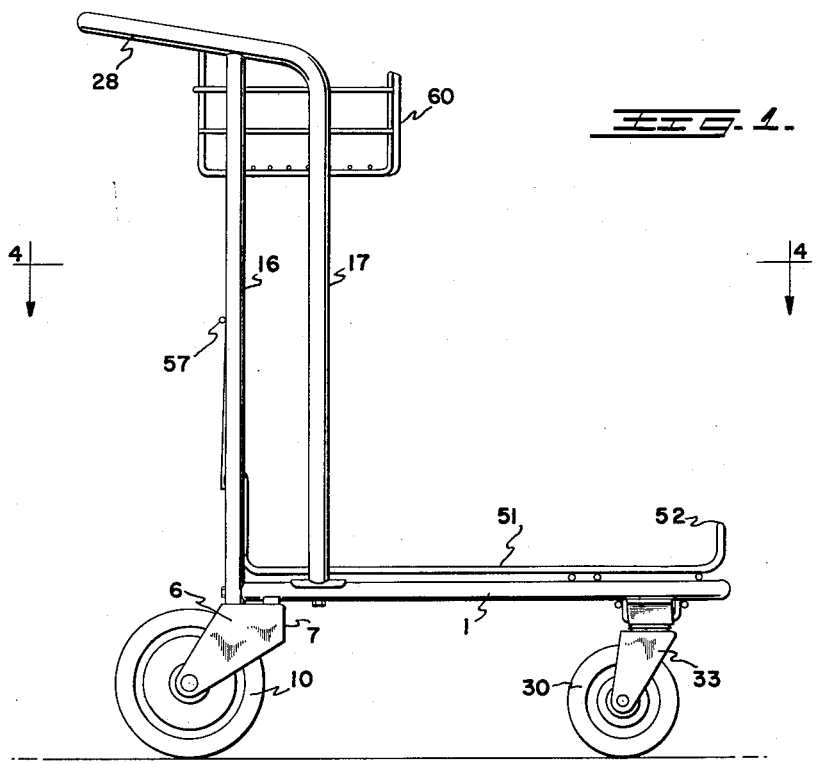
Fig. 1 is a side elevation of a device embodying the present invention.
Figure 2:
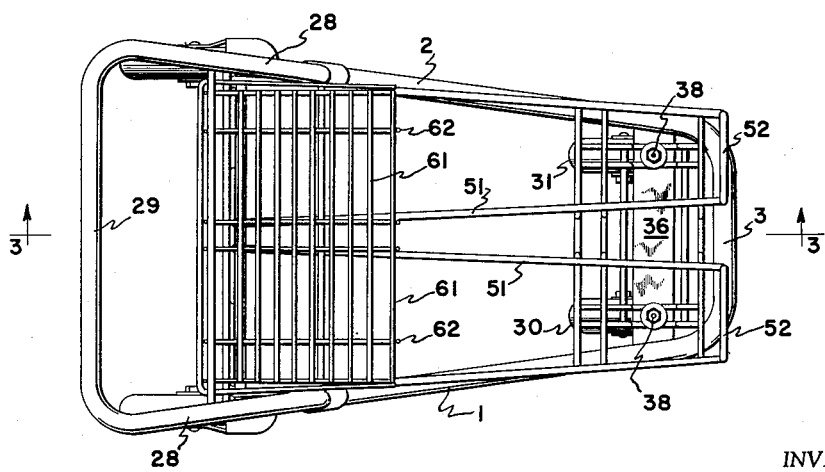
Fig. 2 is a top plan view of the assembly.
Figure 3:
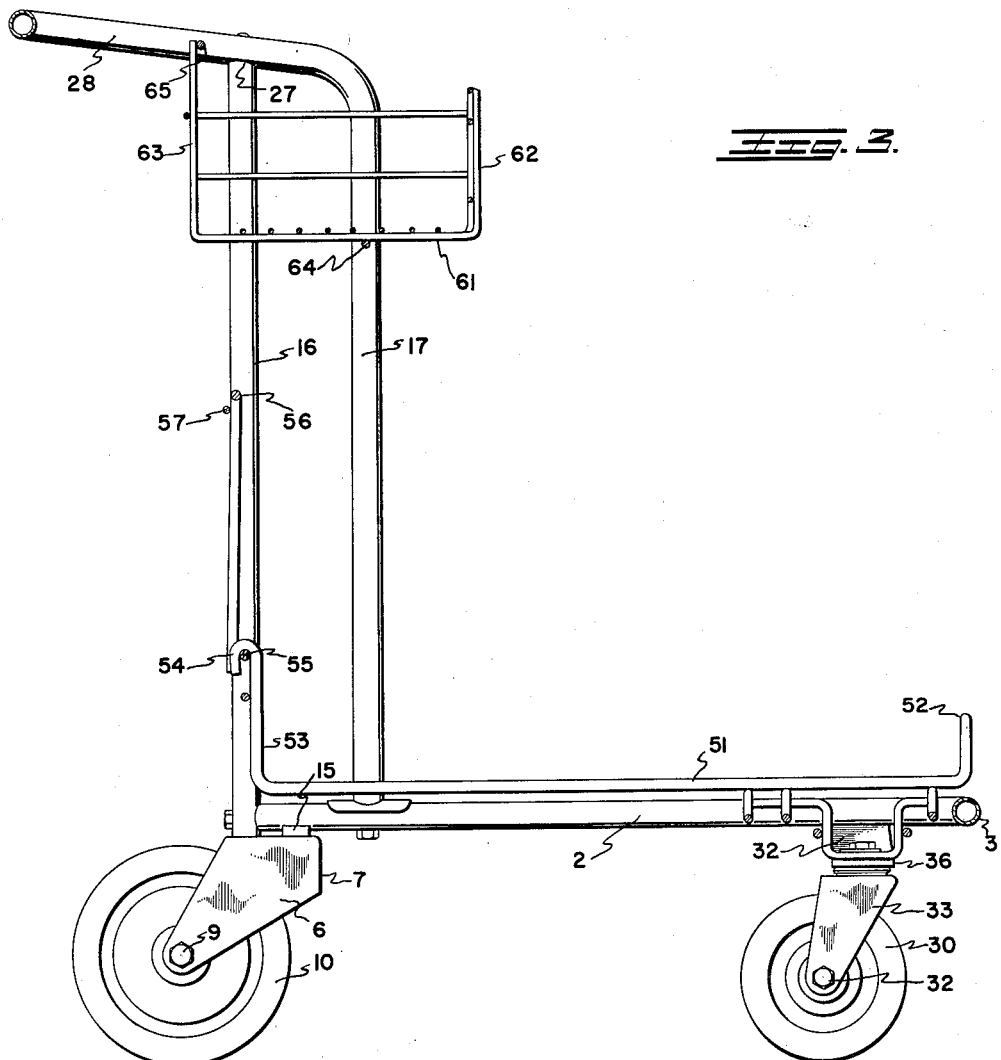
Fig. 3 is a transverse section on line 3—3 of Fig. 2.
Figure 6:
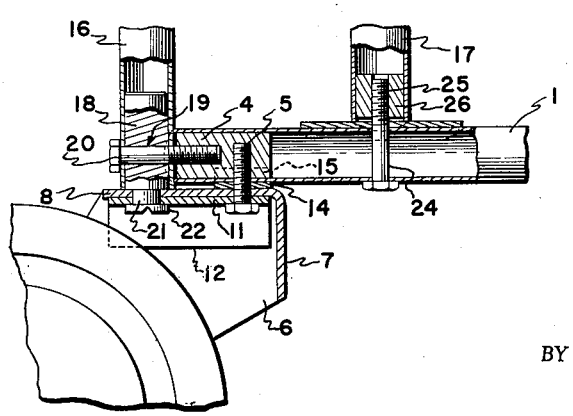
Fig. 6 is a detail of the rear wheel mounting, the parts being shown in section to illustrate the fastening means.

The present invention includes a horizontal base frame of U-shaped construction and embodying rearwardly diverging side frame members 1 and 2 and front connecting part 3, this base frame being formed as an integral body and normally chrome plated with the rest of the structure. The side base frame members 1 and 2 at their free extremities are each provided with plugs 4 which are rigidly fixed in place by screw bolts 5 which form one of the connecting means between the wheel housings and the frame. The wheel housings each include a pair of sidewalls 6 connected by the front end wall 7 and top connecting wall 8. These housings may be shaped by stamping or otherwise and are of integral structure. The sidewalls 6 extend downwardly and are provided with aligned openings for the axle pins 9 which mount the rear wheels 10. Suitable bearing structures may be provided for the wheels. The inner face of the wheel housings is provided with a U-shaped reinforcing plate 11 which includes the side flanges 12, thus lending transverse rigidity to the housings and providing for a rigid construction between the housings and the frame. It will be noted that the bolt 5 which is one of the connections between the free ends of the frame members 1 and 2 and the housing extends through the filler plate 11 and the top plate 8 and a filler block 14 and then through a threaded opening formed in the plug 4.

The filler blocks 14 are of U-shaped design including upwardly extending flanges 15 which embrace the side faces of the adjacent portions of the frame members 1 and 2. The upright main frame of the structure includes the laterally spaced pair of standards 16 and 17, the standards 16 each having a plug 18 at its lower end and the lower end of standards 16 being formed with horizontal openings 19 through which a bolt 20 extends and is threaded axially into the plugs 4 at the end of the arms 1 and 2. Thus the bolts 5 and 20 secure the uprights or standards 16 to the extremities of the arms 1 and 2 of the base frame and in addition provide additional securing means for the wheel housing. This additional fastening means includes rivet heads 21 formed at the lower ends of the plugs 18, these rivets being swaged or flanged as at 22 against the inner face of the filler plate 11 to permanently secure the parts in position. In assembly the plug 18 can be secured to the housing as a portion of the housing assembly and the bolts 5 and 20 later positioned and seated to connect the associated parts.

Second uprights or standards 17 provided forwardly of the standards 16 at each side of the cart assembly are secured near the free ends of the side members or arms 1 and 2 by bolts 24 which extend through the arms 1 and 2 and are threaded as at 25 into the plugs 26 fixed in the lower ends of the standards 17. This structure, completing the assembly of the frame, includes the horizontal supporting bottom frame portions 1 and 2 and the uprights 16 and 17, it being noted that the forward uprights 17 are bent rearwardly as at 27 and secured as at 28 to the tops of the rear uprights 16 and then connected by intermediate portions 29. The rear wheels are not swiveled in the present assembly, however, the forward supporting wheels 30 and 31 are mounted to permit a swiveling movement to facilitate steering of the cart.

The mounting of the swiveled wheels 30 and 31 is best shown in Figs. 4 and 5. In these figures, it will be noted that the wheels 30 and 31 are supported on bearing pins 32 which extend through the U-shaped yoke swivels 33 at their lower extremities, the top of the yokes 34 forming a support for the swivel bearings 35. A flat U-shaped strap having intermediate portion 36 and upwardly and laterally extending portions 37 rests upon the wheel bearings 35 and is connected to a fabricated frame by bolts 38 and clamp washers 39. The free ends 37 of the U-shaped strap clamp at 40 against the bottom adjacent faces of the arms 1 and 2 of the main frame. The fabricated frame includes a plurality of transversely extending rods 41, 42 and 43, these rods overlying arms 1 and 2 of the main frame and being formed with medial downwardly offset aligned portions 44. Connecting these transverse rods 41, 42 and 43 of the fabricated frame are spaced pairs of longitudinally extending parallel rods 45 which are welded to the under faces of the rods 41, 42 and 43 at their points of intersection. The spaced pairs of parallel rods 45 include downwardly offset portions 46 which provide saddle structures upon which the clamp washers 39 seat. It will be noted that by tightening the bolts 38 the clamp washers 39 will bind the fabricated frame to the U-shaped strap, thus clamping the fabricated frame downwardly upon the top of the main frame arms 1 and 2 and the free ends 37 of the U-shaped strap frame member against the under face of the main frame members 1 and 2. The bolts 38 and the clamp washers 39, therefore, bind the fabricated frame and wheel supporting structure to the front of the main frame and permit convenient assembly of the parts. It will be noted that the downwardly extending offset portions 46 are reinforced by the cross braces 50 which act as spacers and retain the parts against distortional movement under load.

In addition to the fabricated frame structure heretofore described forming a supporting and connecting means for the swiveled wheels 30 and 31, the transverse frame elements 41, 42 and 43 of this frame also form supports for the U-shaped forwardly converging, longitudinally extending carrier elements, each of which includes the forwardly extending, converging side members 51 and upwardly extending connecting end portions 52, the latter forming a stop to prevent accidental displacement of luggage which might be supported on the rods 51 which form the immediate supporting elements for the luggage. The extremities of the rods 51 of the U-shaped elements or wickets extend upwardly as at 53 and terminate in hooks 54, the hooks overhanging connecting rods 55 extending transversely between the uprights 16. An additional bracing frame is provided and embodies the upper connecting rod 56 and brace rod 57. The extent of bracing can be varied to obtain the necessary rigidity of the structure.

Positioned well above the main luggage supporting frame as primarily defined by frame members 1 and 2 and carried by the upright frame members 16 and 17 is a fabricated article tray 60. This tray is of general rectangular form including a base 61, front wall 62, and rear wall 63. The base 61 of the tray rests on a rod 64 connecting the front uprights 17 while the rear wall of the tray has frame members extending upwardly and secured to the rod 65 arranged between the rearwardly extending handle portions 28 of the uprights 17. This tray structure is convenient for handling small or fragile articles to keep the latter from getting lost or injured which might occur if such small articles were handled with larger luggage which might be stacked on the main load platform.

By means of the foregoing described structure, it will be obvious that a luggage cart has been designed for use in railway stations and bus stations having capabilities of nesting so as to facilitate the parking of a large number of such carts in limited space. It will also be obvious that the structure is such that the parts can be disassembled and shipped to the point of use where they can be readily assembled. Also it will be apparent to one skilled in the art that the various parts comprising the structure are replaceable so as to permit repair at minimum cost without the necessity of refabrication of any kind.

What I claim is:

1. In a nesting luggage carrying vehicle, a base frame of U-shaped form having its side frame members converging forwardly and lying generally in a horizontal plane, plugs arranged in the extremities of said side frame members, forwardly and rearwardly spaced vertical frame members, the forwardly arranged vertical frame members having their upper ends bent rearwardly and overlying the upper extremities of the rear vertical frame members and projecting rearwardly thereof to provide a handle for the vehicle, said forwardly arranged vertical frame members being connected at their lower ends to the top portions of the side frame members, the rearwardly arranged vertical frame members being connected at the ends of said side frame members, wheel supporting housings, means for securing said wheel housings to the framing structure at the junction of the terminals of the side frame members and the rear vertical frame members including plugs extending upwardly into the bottom terminals of the rear vertical frame members, the plugs in the rear vertical frame members having end portions in riveted engagement with the housings, forwardly arranged bolts extending upwardly through the wheel housings into the plugs in the extremities of the side frame members, bolts extending through the plugs in the ends of the side frame members and rear vertical frame members, swiveled wheels at the forward end of the cart structure, said swiveled wheels being mounted on a connecting plate, and means clamping the connecting plate to the horizontal base frame.

2. The structure of claim 1 characterized in that the swiveled wheels at the forward end of the cart are carried by a plate which is clamped to the bottom of the U-shaped base frame by spaced bolts which engage and secure to the top of the U-shaped base frame a fabricated structure.

3. In a nesting luggage carrying vehicle, a base frame of U-form having its side frame members converging forwardly and lying generally in a horizontal plane, forwardly and rearwardly spaced vertical frame members connected at the free end portions of each of said side frame members, the forwardly arranged vertical frame members having their upper ends extending rearwardly and overlying the upper extremities of the rear vertical frame members and projecting rearwardly thereof to provide a handle for the vehicle, rear wheel housings, wheels supported by said housings, said housings being connected to and supported by the adjacent ends of the side frame members and rear vertical frame members and forming a connecting means for these parts, swiveled wheels at the forward end of the vehicle, said wheels being supported by a transversely positioned plate, said plate having end portions abutting the bottom face of the U-shaped base frame, a fabricated frame overlying portions of the U-shaped base frame, and means for clamping the U-shaped base frame member between the fabricated frame and the wheel supported plate member.

4. The structure of claim 3 characterized in that rear wheel housings are secured to the lower extremities of the rear vertical frame members by plugs extending into the lower ends of the rear vertical frame members, the plugs having rivets extending through openings in the housings and forming enlarged heads when riveted thereover.

5. The structure of claim 3 characterized in that rear wheel housings are secured to the lower extremities of the rear vertical frame members by plugs extending into the lower ends of the rear vertical frame members, the plugs having rivets extending through openings in the housings and forming enlarged heads when riveted thereover and the plugs are formed with transverse bolt openings to receive fastening means for securing the rear vertical frame members to the extremities of the base frame.

6. The structure of claim 3 characterized in that the wheel housings are secured at their forward ends by bolts which extend through the housings and transversely into plugs arranged in the extremities of the free ends of the base frame.

7. The structure of claim 3 characterized in that the rear vertical frame members are connected by transverse brace bars and a package carrier is mounted between the vertical frame members at their upper ends and form additional bracing means for the vertical frame members.

8. The structure of claim 3 characterized in that a pair of forwardly converging U-shaped members overlie the base frame member to form a platform therefor, the U-shaped members being formed with vertical extensions at their front ends and having their rear end portions looped about a brace member connecting the rear vertical frame members.

References Cited in the file of this patent

UNITED STATES PATENTS

| | | |
|---|---|---|
| 1,958,494 | Pehrsson | May 15, 1934 |
| 2,174,870 | Daniels | Oct. 3, 1939 |
| 2,605,116 | Alexander | July 29, 1952 |
| 2,665,922 | Bard | Jan. 12, 1954 |

FOREIGN PATENTS

| | | |
|---|---|---|
| 812,990 | Germany | Sept. 6, 1951 |